US006643728B1

(12) United States Patent
Crutchfield et al.

(10) Patent No.: US 6,643,728 B1
(45) Date of Patent: Nov. 4, 2003

(54) METHOD AND APPARATUS FOR CONVERTING IEEE 1284 SIGNALS TO OR FROM IEEE 1394 SIGNALS

(75) Inventors: David Allen Crutchfield, Lexington, KY (US); Stephen Kelly Cunnagin, Lexington, KY (US); Timothy John Rademacher, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 542 days.

(21) Appl. No.: 09/583,662

(22) Filed: May 30, 2000

(51) Int. Cl.[7] .............................................. G06F 13/36
(52) U.S. Cl. ........................................ 710/315; 710/313
(58) Field of Search ................................ 710/305–315, 710/62–74

(56) References Cited

U.S. PATENT DOCUMENTS

| | | | |
|---|---|---|---|
| 5,675,139 A | | 10/1997 | Fama |
| 5,729,683 A | | 3/1998 | Le et al. |
| 5,787,259 A | | 7/1998 | Haroun et al. |
| 5,793,366 A | | 8/1998 | Mano et al. |
| 5,802,069 A | | 9/1998 | Coulson |
| 5,815,509 A | | 9/1998 | Deng et al. |
| 5,815,678 A | | 9/1998 | Hoffman et al. |
| 5,819,111 A | | 10/1998 | Davies et al. |
| 5,875,313 A | | 2/1999 | Sescila, III et al. |
| 5,929,655 A | * | 7/1999 | Roe et al. ...................... 326/82 |
| 5,948,080 A | * | 9/1999 | Baker ........................... 710/37 |
| 6,040,792 A | * | 3/2000 | Watson et al. ............... 341/100 |
| 6,101,567 A | * | 8/2000 | Kim et al. ..................... 710/305 |
| 6,161,157 A | * | 12/2000 | Tripathi et al. ............... 710/109 |
| 6,191,713 B1 | * | 2/2001 | Ellis et al. .................... 341/100 |
| 6,218,969 B1 | * | 4/2001 | Watson et al. ............... 341/100 |
| 6,233,640 B1 | * | 5/2001 | Luke et al. ................... 710/315 |
| 6,256,687 B1 | * | 7/2001 | Ellis et al. ..................... 710/71 |
| 6,275,886 B1 | * | 8/2001 | Levy .............................. 710/313 |

\* cited by examiner

Primary Examiner—Sumati Lefkowitz
(74) Attorney, Agent, or Firm—Frederick H. Gribbell

(57) ABSTRACT

An improved signal converter is provided to interface between an IEEE 1284 (parallel) bus or device and an IEEE 1394 (serial) bus or device. The converter in its preferred embodiment is designed for use with printers, in which the printer communicates with the converter through either the converter's 1284 port or its 1394 port. In one system, the converter acts as a "1284-to-1394 converter" to interface between a printer (on the 1394 port) and a host computer (on the 1284 port). In a second system, the converter acts as a "peer-to-peer 1394-to-1284 converter" to interface between a printer (on the 1284 port) and some type of 1394 compliant device (on the 1394 port), such as a digital camera. The converter includes a Link layer that is embedded within an ASIC, which preferably includes a microcontroller or a logic state machine, to facilitate asynchronous data transfer. The ASIC acts as an interpreter between the 1284 bus and the microcontroller interface of the Link layer, and is responsible for mode negotiation and mode operation as defined in the IEEE 1284 standard. In the 1284-to-1394 converter mode of operation, the converter provides a 1284 controller in a "slave" mode, thereby allowing the 1394 side of the microcontroller to act as the controlling "master" of the converter system. In the peer-to-peer 1394-to-1284 converter mode of operation, the converter provides a 1284 controller which operates as a "master" for the printer's slave controller, thereby initiating and controlling the flow of data on the 1284 interface. Since the converter is the master of the 1284 interface, it is also responsible for reading the alerts from the printer, once the printer is "armed" to provide such alerts.

27 Claims, 10 Drawing Sheets

PEER-TO-PEER 1394-TO-1284 CONVERTER

METHOD AND APPARATUS FOR CONVERTING IEEE 1284 SIGNALS TO OR FROM IEEE 1394 SIGNALS

TECHNICAL FIELD

The present invention relates generally to communications protocol converters and is particularly directed to an IEEE 1284-to-IEEE 1394 converter of the type which interfaces to a printer. The invention is specifically disclosed as a 1284-to-1394 converter that interfaces to a host computer on the 1284 bus and a printer or other digital peripheral device on the 1394 bus, and also as a peer-to-peer IEEE 1394-to-IEEE 1284 converter that interfaces between a printer having a 1284 port and a digital device on the 1394 bus.

BACKGROUND OF THE INVENTION

The IEEE 1394 bus is a low cost, high performance serial interface that will eventually replace the parallel port, SCSI, and other communications interfaces on peripheral devices, such as printers. It also allows for peripheral-to-peripheral connections without a host PC. A printer having a 1394 port could directly interface with some of the new digital peripherals, such as the digital cameras.

The IEEE 1394 protocol generally requires a Physical layer (also called the "Phy"), a Link layer, and a microcontroller interface for asynchronous data transfer. The Phy handles both the transmitting and the receiving of analog signals transmitted across the 1394 bus. When receiving data the Phy converts the data into a clock digital format needed for the Link layer. When sending data, the Phy takes clock digital data from the Link layer, and converts it into the analog format needed for the IEEE 1394 bus.

U.S. Pat. No. 5,815,509 (by Deng) discloses a method for testing memory in an interface system that couples a parallel host bus to a serial IEEE 1394 bus. The interface controls transmission of data from the parallel host bus to the IEEE 1394 serial bus, and to control reception of data by the parallel bus from the serial bus. One primary objective of the invention is to be able to test memory in the interface system that couples the parallel host bus to the serial bus. The Deng system includes a random access memory, a transmission control unit to control data sent from the parallel host bus to the serial bus, a reception control unit that controls reception of data at the parallel bus from the serial bus, and a "test unit" that selectively controls the RAM to internally generate addresses and later selectively relinquish control of the RAM to allow transmission of data between the serial bus and the parallel bus.

U.S. Pat. No. 5,875,313 (by Sescila) discloses a bus translator between a PCI bus to an IEEE 1394 bus, used for coupling a PCI device to a host computer via the IEEE 1934 bus. The translator can translate addresses of PCI bus cycles initiated by the PCI device into 1394 memory addresses and performs data transfers between the PCI device and host computer using the translated 1394 memory addresses. It also translates 1394 memory addresses of 1394 request packets received from the host computer into PCI cycle addresses and performs data transfers between the PCI device and host computer by initiating PCI bus cycles targeted at the PCI device using the translated PCI bus cycle addresses. The main thrust of this invention is to provide some type of test instrument on a PCI chassis, in which the PCI to 1394 translator is plugged into this PCI chassis. The serial IEEE 1394 bus is used to connect to a host computer. An example of the test instrument is an oscilloscope, multimeter, pressure sensor, or data acquisition device.

U.S. Pat. No. 5,815,678 (by Hoffmnan) discloses a high-level application programming interface that allows digital data to be transported over an IEEE 1394 serial bus. The application programming interface (API) is connected to a "Transaction Layer," "Link Layer," and "Physical Layer," before reaching the IEEE 1394 physical interface. The "host unit" has a "host bus" which also could be an IEEE 1394 bus, or could be any other bus protocol. In one example of a product development environment, two different PC's are connected to one another by an IEEE 1394 cable, and one computer is a printer simulator while the other computer is the printer driver being developed. Another example discloses a PC having printer driver test code that is connected to a physical printer by an IEEE 1394 cable, in which the printer has an IEEE 1394 interface and its software is in development. According to Hoffman, the computer could then exercise all functions of the printer using the IEEE 1394 connection, including the use of a word processor to send true printer data to the printer for a final evaluation.

U.S. Pat. No. 5,793,366 (by Mano) discloses a graphical user interface that displays graphical images representing devices coupled to a serial bus structure, preferably an IEEE 1394 bus. When a device is added to the serial bus, a graphical image representing that device is automatically displayed on the graphical user interface monitor. Tasks performed by devices coupled to the serial bus are also controlled and monitored by the user through the graphical user interface. When a device is added to the serial bus, an animated stream of data temporarily flows between the graphical image of the new device and the computer system. A "video printer" is depicted as being one of the devices that can be connected to the IEEE 1394 serial bus, and can be directly coupled to a digital camera via the 1394 serial bus.

Converters between a parallel bus and an IEEE 1394 (serial) bus have been available, but the designer typically has available chip-level or board-level components that are integrated only to a certain extent. For example, Physical layer chips are already available as a standard part, and Link layers are also available as a standard chip. However, these separate components can be better utilized if integrated into a unitary system of low component count that includes the necessary intelligence to provide handshaking between the 1284 bus and the Link layer.

SUMMARY OF THE INVENTION

Accordingly, it is a primary advantage of the present invention to provide a 1284-to-1394 converter that is highly integrated and performs handshaking between the 1284 bus and a Link layer, and provides interfacing between the 1394 bus, a Physical layer, and the Link layer.

It is another advantage of the present invention to provide a highly integrated 1284-to-1394 converter that interfaces between a host computer via a 1284 bus and a peripheral device such as a printer or digital camera via a 1394 bus, in which the 1284 bus communicates with a Link layer, and the 1394 bus communicates via a Physical layer.

It is yet another advantage of the present invention to provide highly integrated 1284-to-1394 converter that interfaces between a host computer via a 1284 bus and a peripheral device such as a printer or digital camera via a 1394 bus, in which the 1284 bus communicates with a Link layer that is embedded within an ASIC that also contains controller logic.

It is a further advantage of the present invention to provide a peer-to-peer 1394-to-1284 converter that is highly integrated and provides interfacing between the 1394 bus, a Physical layer, and a Link layer, and further provides a peripheral interface to a 1284 bus and performs handshaking between the 1284 bus and the Link layer.

It is a yet further advantage of the present invention to provide a highly integrated peer-to-peer 1394-to-1284 converter that interfaces between a first peripheral device such as a printer via a 1284 bus and a second peripheral device such as a digital camera via a 1394 bus, in which the 1284 bus communicates with a Link layer, and the 1394 bus communicates via a Physical layer.

It is still a further advantage of the present invention to provide highly integrated peer-to-peer 1394-to-1284 converter that interfaces between a first peripheral device such as a printer via a 1284 bus and a second peripheral device such as a digital camera via a 1394 bus, in which the 1284 bus communicates with a Link layer that is embedded within an ASIC that also contains controller logic.

Additional advantages and other novel features of the invention will be set forth in part in the description that follows and in part will become apparent to those skilled in the art upon examination of the following or may be learned with the practice of the invention.

To achieve the foregoing and other advantages, and in accordance with one aspect of the present invention, an improved 1284-to-1394 converter is disclosed, in which the inventive methodology includes providing a Link layer that communicates with a 1284 port, a Physical layer that communicates with a 1394 bus, a host device that is in communication with the 1284 port, and at least one 1394 compliant device that is in communication with the 1394 bus; controlling the Physical layer by attempting to configure the 1394 compliant device; and controlling the Link layer by inspecting the 1284 port and determining whether or not data is being received at the 1284 port from the host device, and if so, determining whether or not the received data is to be transmitted to the 1394 compliant device over the 1394 bus, and if so, converting the received data and transmitting it to the 1394 compliant device.

In accordance with another aspect of the present invention, an improved peer-to-peer 1394-to-1284 converter is disclosed, in which the inventive methodology includes providing a Link layer that communicates with a 1284 port, a Physical layer that communicates with a 1394 bus, a peripheral device that is in communications with the 1284 port, and at least one 1394 compliant device that is in communication with the 1394 bus; controlling the Link layer by asserting a select signal to the peripheral device by way of the 1284 port and receiving a response signal from the peripheral device; and controlling the Physical layer by examining the 1394 compliant device, receiving data by way of the 1394 bus and determining an active protocol of the received data, determining whether or not the received data comprises a predetermined type of data, and if so, converting and transmitting the predetermined type of data using the active protocol to the peripheral device by way of the 1284 port.

In accordance with yet another aspect of the present invention, an improved IEEE 1284-to-IEEE 1394 converter apparatus is disclosed, in which the inventive structure includes a 1284 interface circuit; a controller circuit; a Physical layer that acts as a 1394 interface circuit; and a Link layer that is in communication with the 1284 interface circuit, and which is in communication with the Link layer; and wherein the controller circuit and Link layer are contained within a unitary electronic structure.

Still other advantages of the present invention will become apparent to those skilled in this art from the following description and drawings wherein there is described and shown a preferred embodiment of this invention in one of the best modes contemplated for carrying out the invention. As will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description and claims serve to explain the principles of the invention. In the drawings:

DETAILED DESCRIPTION OF THE PREFERRED EMBODIMENT

Figure 1:
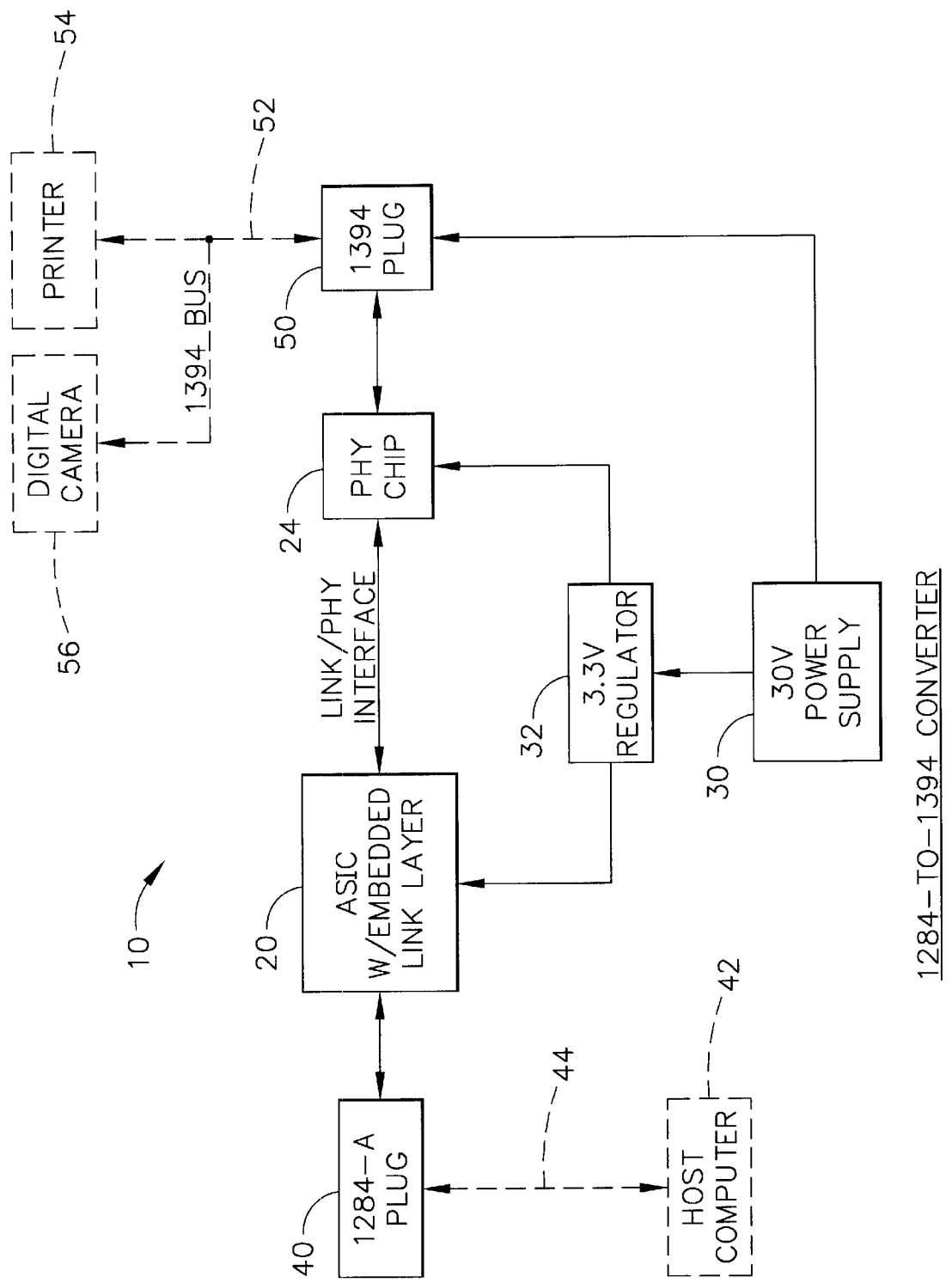
FIG. 1 is a block diagram of the major components of a 1284-to-1394 converter, as constructed according to the principles of the present invention.

Reference will now be made in detail to the present preferred embodiment of the invention, an example of which is illustrated in the accompanying drawings, wherein like numerals indicate the same elements throughout the views.

A converter is provided to interface between an IEEE 1284 (parallel) bus or device and an IEEE 1394 (serial) bus or device. The converter in its preferred embodiment is designed for use with printers, in which the printer communicates with the converter through either the converter's 1284 port or its 1394 port. In one system, the converter acts as a "1284-to-1394 converter" to interface between a printer (on the 1394 port) and a host computer (on the 1284 port). In a second system, the converter acts as a "peer-to-peer 1394-to-1284 converter" to interface between a printer (on the 1284 port) and some type of 1394 compliant device (on the 1394 port), such as a digital camera.

In addition to a conventional Physical layer (or "Phy" circuit), the converter of the present invention includes a Link layer that preferably is embedded within an ASIC (Application Specific Integrated Circuit). The preferred ASIC will additionally include a microcontroller or a logic state machine, to facilitate asynchronous data transfer. The Phy circuit handles both the transmitting and the receiving of analog signals transmitted across the 1394 bus. When receiving data the Physical layer will convert the data into a clock digital format the Link layer can understand. When sending data, the Phy circuit takes clock digital data from the Link layer, and converts it into the analog format needed for the IEEE 1394 bus. The Link layer contains a FIFO that stores a packet of data from the microcontroller or from the Phy circuit. The microcontroller will either read or write the FIFO of the Link layer, depending upon the action that is required.

The preferred ASIC acts as an interpreter between the 1284 bus and the microcontroller interface of the Link layer. The ASIC is responsible for mode negotiation and mode operation as defined in the IEEE 1284 standard. The recommended mode of data transfer is the ECP mode (which provides a relatively fast data transfer rate through a parallel port), although 1284 compliant devices are also able to operate in Compatibility Mode and Nibble Mode.

In the 1284-to-1394 converter mode of operation, the converter of the present invention provides a 1284 controller in a "slave" mode, thereby allowing the 1394 side of the microcontroller to act as the controlling "master" of the converter system. The converter can even act as the 1394 "bus manager," if that is desired in appropriate situations. Upon a 1394 bus reset, the converter will look for a printer on the 1394 bus, and after a printer is found, will configure that printer so as to make it possible for that printer to enter into communications with a host computer that is attached to the 1284 side of the converter.

When the host sends NPAP (i.e., Network Printing Alliance Protocol) data packets to the 1284 port of the converter, the converter determines if the data packets are being sent to a "converter logical unit" or to a "printer logical unit." Data packets to the converter logical unit can include commands to "read" the printer, which are used by the host to find out information about the printer (including its address on the 1394 bus). In this manner, the host could communicate with any type of printer that is connected to the 1394 bus. Data packets to the printer logical unit are transmitted to the printer over the 1394 bus, and can include any type of print data that would be possible between other types of networked host and printer systems, especially one using the NPAP. The attached 1394 bus could be used to communicate with several different 1394 devices (i.e., 1394 compliant devices) in addition to the printer. In fact there could be several different printers (or other types of output devices) connected to this 1394 bus, as well as input-type devices, such as digital cameras.

In the peer-to-peer 1394-to-1284 converter mode of operation, the converter of the present invention provides a 1284 controller which operates as a "master" for the printer's slave controller, thereby initiating and controlling the flow of data on the 1284 interface. Since the converter is the master of the 1284 interface, it is also responsible for reading the alerts from the printer, once the printer is "armed" to provide such alerts. If desirable, the printer's alerts are provided via the 1394 bus to a 1394-compatible device, such as a host computer or a digital camera. Devices connected to the 1394 bus can communicate via the converter to the printer, and this could include a system in which a digital camera connected to the 1394 bus provides image data to the printer on the 1284 port of the converter.

The peer-to-peer 1394-to-1284 converter upon initialization attempts to "find" a supported printer on the 1284 port, and once that has occurred, arms alerts in that printer. Thereafter, the converter periodically checks for messages that are sent by the printer in one of a plurality of supported data formats.

The converter also functions to receive data messages from the 1394 bus, and where appropriate, pass those messages to the printer via the 1284 port in the correct (i.e., current supported) data format. Before any reception of data messages, however, the converter upon a 1394 bus reset first determines if it is to be the bus manager. If so, the converter manages the power consumption of the devices on the 1394 bus. Once that has occurred, the converter (if it becomes the bus manager) sends Link-On packets to devices that are to become active on the 1394 bus.

Referring now to the drawings, FIG. 1 shows a block diagram of a 1284-to-1394 converter, generally designated by the reference numeral 10, as constructed according to the present invention. The 1284-to-1394 converter 10 allows a 1394 printer 54 to be attached to a personal computer (PC) 42 having a 1284 (parallel) port. A 1284-A plug 40 is a male DB25 connector that plugs into the mating receptacle on the PC 42, via a set of parallel printer connectors or pin-outs at 44. The parallel pin-outs carry the standard seventeen signal lines normally found between host computers and printers. Many printers contain 1284-B connectors, often referred to as "Centronics" connectors, which allow the seventeen signal lines to pass therethrough.

The converter 10 has a 6-conductor 1394 cable and a 1394 plug at 50 to attach to the 1394 socket on the printer or to the socket of another 1394 compliant device (such as a digital camera, as illustrated at 56). The 1394 protocol uses six signal lines, of which a first pair of lines carries +TPA and TPA*, a second pair of lines carries CLK1 and CLK2 as a first differential signal, and a third pair of lines carries DATA1 and DATA2 as a second differential signal.

Any 1394 compliant device (also referred to herein as a "1394 device") may communicate with any other 1394 device on the same bus (e.g., a 1394 Bus, at 52). Therefore, it is possible for the converter 10 to be connected at any point on the 1394 bus with the printer 54. The converter 10 could be connected to digital camera 56 and would still be able to communicate with the printer 54, and the camera 56 and printer 54 could also communicate with one another over the 1394 bus 52.

Electrical power typically is not available on the 1284-A connector nor the 1394 connector of the printer. While it is possible that another 1394 device attached to the 1394 bus 52 would supply power, it is assumed that in most cases converter 10 will not be used with any other 1394 devices. Therefore, the preferred converter 10 will include its own power supply, and also sources electrical power onto the 1394 bus 52. The power supply at 30 on FIG. 1 produces 30 VDC, which powers a 3.3 Volt regulator at 32 for the converter electronics. The 30 VDC power rail is also connected to the 1394 connector 50 with appropriate circuit protection devices.

A "Phy" circuit at 24 is included in the converter 10, and can comprise a standard 1394 physical-layer integrated circuit. The Phy 24 is a mixed signal (analog and digital) device, and converts logic-level data to a serial stream of analog differential signals on the 1394 bus. The Phy circuit 24 acts as a conventional Phy chip, which receives serial data from a 1394 bus, and outputs parallel data at CMOS signal levels to a "Link layer" circuit, such as the 1394 Link layer that is described below. The Phy 24 also handles some of the low-level 1394 protocol.

Figure 2:
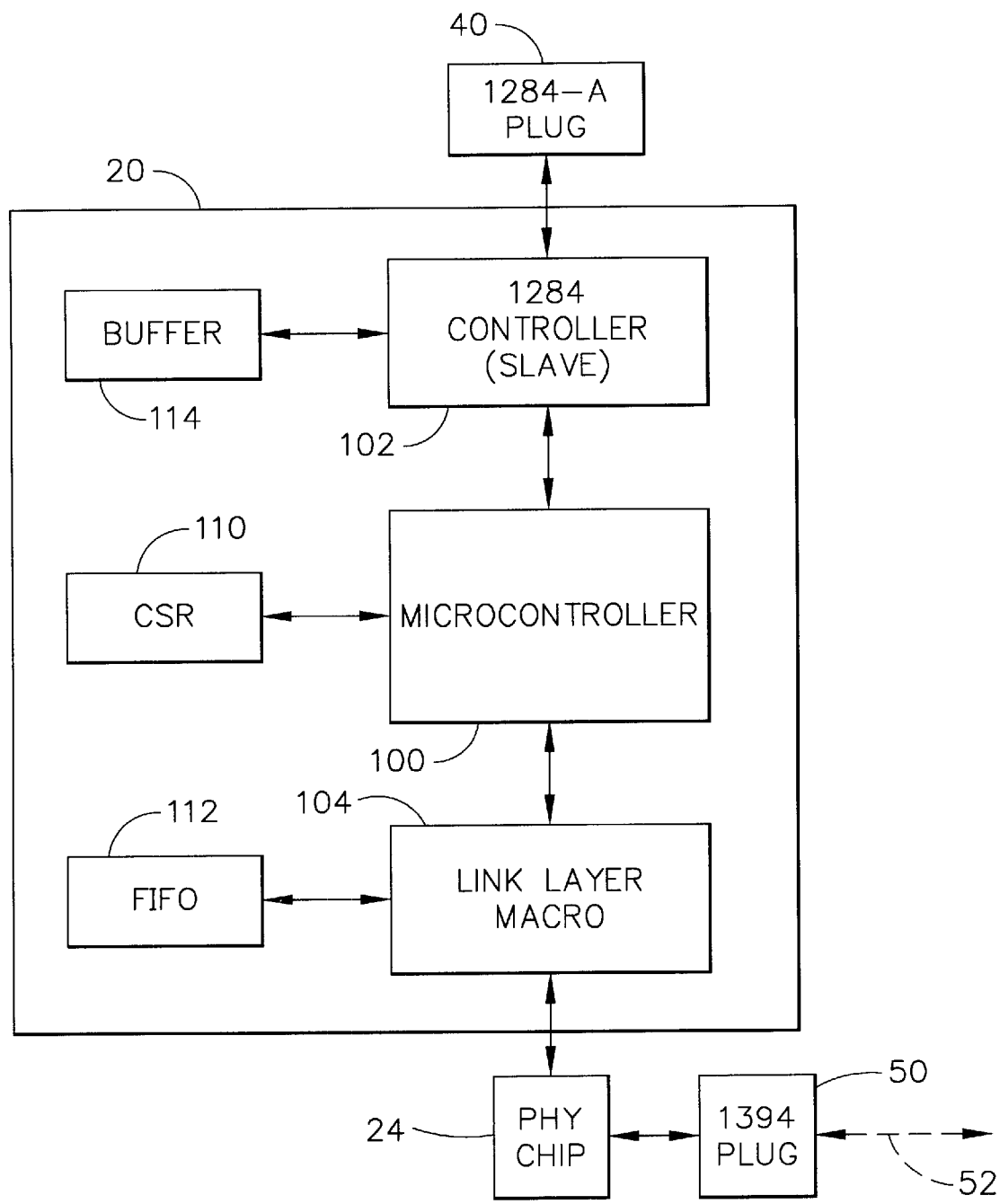
FIG. 2 is a block diagram of some of the hardware components of the preferred ASIC used in the 1284-to-1394 converter of FIG. 1.

Most of the interfacing work in the converter 10 is done in an ASIC 20, which contains an embedded 1394 Link layer. A block diagram of the ASIC 20 is shown in FIG. 2. A Link layer macro at 104 preferably is of a conventional design for use with 1394 devices. The Link layer 104 is embedded in the ASIC for cost savings, and since it is entirely digital, it can easily be implemented in the digital ASIC. The Link layer macro 104 uses static RAM (SRAM) modules for FIFO buffers (at 112) to temporarily hold data received or data to be transmitted.

Link layer 104 is sometimes referred to herein as a "macro" because it mainly consists of programmable elements that are determined by the computer "code" that programs the ASIC 20. Link layer 104 acts in many ways as a conventional Link layer chip that receives 8-bit parallel data at CMOS signal levels from the Phy, and outputs 8-bit parallel data at CMOS signal levels, at a different data transmission rate. In the present invention, the Link layer 104 determines if the receiving address of an incoming data packet is correct for this particular converter 10. If not, the Link layer 104 will ignore the remainder of the data packet.

A 1394 data packet used in the present invention contains a header, then data, and finally an error correction value (e.g., a CRC code). The header includes the receiving address and sending address. The receiving address contains the bus number, the device address on that bus, and the internal address in the device.

A 1284 controller at 102 is a 1284 receiver or slave device that supports byte, nibble, and ECP (i.e., Extended Capabilities Port) modes of operation. This controller block 102 is essentially the same as the 1284 controller used in 1284 printers, and communicates to a 1284-A plug at 40. Finally, a CSR (i.e., Common Status Register) block at 110 contains the control and status registers needed for the IEEE 1394 protocol, according to the ISO/IEC 13213 (IEEE 1212) industry standard. In the present invention, Common Status Register 110 includes information relating to the device identity (e.g., is it a printer, or a camera, etc.), the device capability (e.g., can it be the root node?), and the device address (e.g., in the 1394 protocol, this is a 6-bit value, providing 1–63 possibilities).

An ASIC microcontroller at 100 is included in the illustrated embodiment of FIG. 2, although its logical operations could be implemented either using a microprocessor and its support components, or instead entirely in logic consisting of state machines, registers, and combinatorial logic. In the preferred implementation, the microcontroller 100 is implemented using a microprocessor (see 150 on FIG. 3). The microprocessor implementation substantially reduces the logic design effort, since an existing processor can be used. Also, the microprocessor implementation better facilitates modifications because most modifications would involve changes only to the ROM with no changes needed to the hardware logic. With external non-volatile storage devices (such as ROM, EPROM, Flash, etc.), these changes can be made without modifying the ASIC 20. With an embedded ROM, some of the ASIC internal elements would change, but changing the contents of an embedded ROM is much simpler than modifying other ASIC logic circuits.

Figure 3:
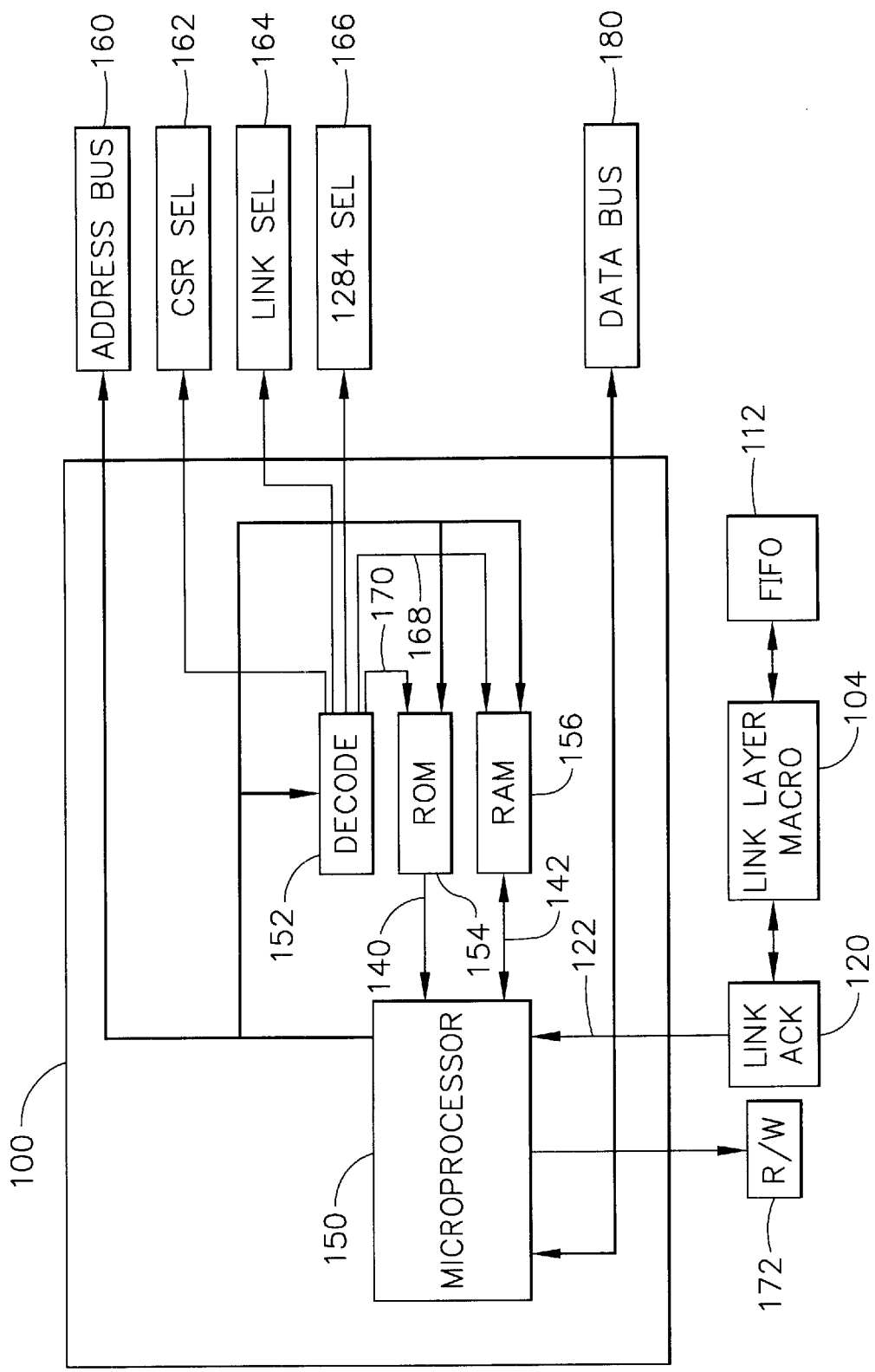
FIG. 3 is a block diagram of a microcontroller circuit embedded in the ASIC of FIG. 2.

A block diagram of the microcontroller 100 with a microprocessor 150 and embedded RAM at 156 and ROM at 154 is depicted in FIG. 3. In addition, the controller 100 contains a "decode" block at 152. This decode block 152 maps the CSR 110, 1284 controller 102, Link layer 104, ROM 154, and RAM 156 blocks into the address space of the microprocessor 150. The CSR block 110, the 1284 controller 102, and the 1394 link-layer 104 each contain registers that can be accessed by microprocessor 150, and the decode block 152 also contains circuitry which allows the microprocessor 150 to read from and write to those registers. The decode block 152 controls several chip select lines to obtain access to the other blocks of circuitry; the CSR block 110 is selected by a "CSR Select" line 162, the Link layer 104 is selected by a "Link Select" line 164, the 1284 controller 102 is selected by a "1284 Select" line 166, and the microcontroller's ROM and RAM are selected typically by multiple lines each, represented at 170 and 168, respectively.

The microprocessor 150 also is in communication with an address bus 160, a data bus 180, and a Read/Write line 172 that are additionally provided to other components of the microcontroller 100, and all ASIC devices that communicate with the microprocessor 150. Microprocessor 150 is further in communication with additional address and data lines at 140 and 142, that interface with the ROM 154 and RAM 156, respectively. A Link Acknowledge signal line at 120 is also in communication with microprocessor 150 to acknowledge communications between the 1394 bus 52 and the microcontroller 100, which involves the Link Layer macro 104 and its associated FIFO buffers at 112, which store data being received and transmitted over the 1394 bus.

Figure 4:
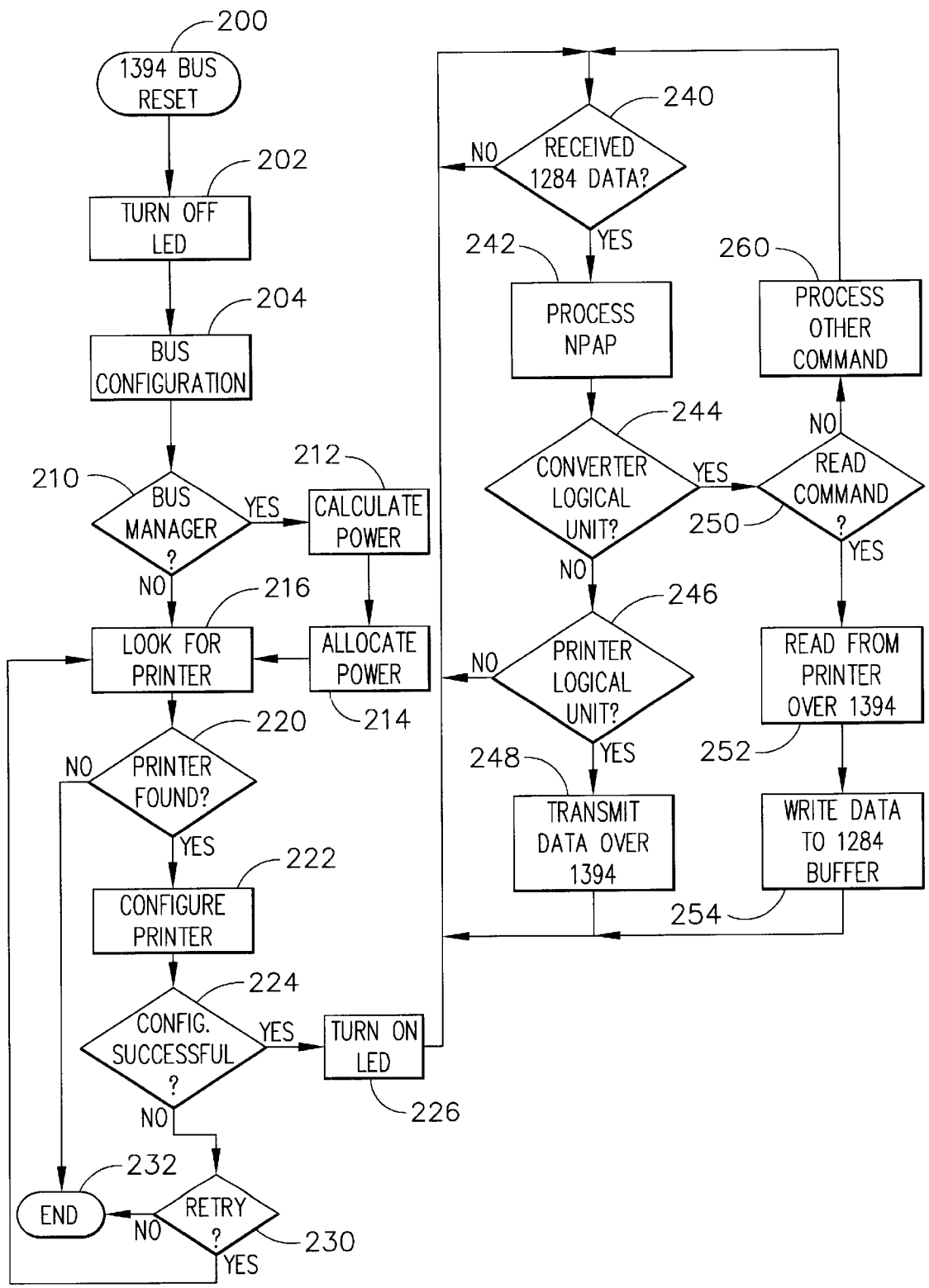
FIG. 4 is a flow chart of some of the functional steps performed by the microcontroller operation of FIG. 4.

A flow chart for the microcontroller operation is shown in FIG. 4. The left half of this flow chart (i.e., steps 200 through 232) deals with 1394 configuration, detecting a printer, and configuring the printer. The right half of the flow chart (i.e., steps 240 through 260) covers receiving and transmitting data after the configuration is complete. Operation begins at a step 200 when a reset on the 1394 bus 52 occurs, signaling a change in the 1394 configuration. The operating logic may jump back to this starting state at 200 from any other state when a bus reset occurs.

It will be understood that the logical operations described in relation to the flow chart of FIG. 4 can be implemented using sequential logic, such as by using microprocessor technology or using a logic state machine; it even could be implemented using parallel logic. The preferred embodiment uses a microprocessor (e.g., microprocessor 150) to execute software instructions that are stored in memory cells within ASIC 20. In fact, the entire microprocessor 150 (and microcontroller 100, for that matter) are contained within ASIC 20 in the preferred mode of the present invention. Of course, other circuitry could be used to implement these logical operations depicted in FIG. 4 without departing from the principles of the present invention.

The 1284 host (e.g., PC 42) sends a command to the converter 10 to identify the target printer (e.g., printer 54). The converter 10 contains an LED (not shown) that indicates that it has both detected and successfully configured the target printer. The first step at 202 after a 1394-bus reset is to turn off this LED to indicate that the converter 10 is not in communication with the printer 54. After the 1394 bus reset, configuration of the 1394 bus 52 occurs at a step 204 in which the addresses are assigned to each device on the bus 52. Part of the configuration is the determination of the 1394 bus manager; the converter 10 has the ability to function as a bus manager. A decision step 210 now determines if converter 10 is the bus manager.

If the converter 10 is selected as the bus manager, it must perform the power management for the bus 52. This consists of determining the power supply capabilities and requirements of each device on the bus 52 and calculating the power demand, at a step 212. The bus manager then allocates the available power to the devices at a step 214, and sends the appropriate devices a Link-On packet to enable them, which allows them to power themselves up.

Whether or not the converter 10 becomes the bus manager, the next step in the configuration procedure is to look for a printer on the 1394 bus 52, using a step 216. If a printer is found (e.g., printer 54) at a decision step 220, then the converter 10 will configure the printer 52 with the correct identification provided by the 1284 Host 42 at a step 222. If no printer is found, then the logic flow is directed to an "End" step 232, where this routine termninates. A decision step 224 now determines if the printer was successfully configured.

If the configuration has been successful, then the LED (not shown) that signifies a printer has been successfully found and configured will be turned on at a step 226. If the configuration was not successful, then the converter stops if only a single printer configuration is allowed. Note that in the preferred embodiment, only one printer configuration is allowed. If support for multiple printers on the 1394 bus is desired, then a decision step 230 will look again for another printer by directing the logic flow back to step 216. It is important to note that in the multiple printer configuration, one 1284 port could be used to access several printers on a 1394 bus. This completes the 1394 bus configuration procedure, which will be repeated each time that a 1394 bus reset occurs.

The microcontroller 100 now begins the data processing logic loop. In the preferred implementation, the data from and to the host computer 42 uses the Network Printing Alliance Protocol (NPAP); however, other protocols could be used as well. NPAP allows the host 42 to send data to multiple logical units. The converter 10 uses two logical units: the converter itself and the printer 54. To write to the printer 54, the host computer 42 writes to the printer logical unit. To read from the printer 54, the host computer 42 writes a readprinter command to the converter 10 logical unit and then reads the printer data from the converter logical unit. The NPAP protocol encapsulates the printer protocol, e.g., SBP-2.

As shown in FIG. 4, microcontroller 100 waits for data from the 1284 port (at plug 40), using a decision block 240. When the microcontroller 100 has received data from the host computer 42, it first processes the NPAP header at a step 242 to determine the destination for the data. If the destination is the converter logical unit, as determined by a decision step 244, then the microcontroller 100 checks to see if the data is a command to read the printer 54. If the data is a read command, as determined by a decision step 250, then the microcontroller 100 extracts from the command data the printer address and the number of bytes to be read, at a step 252. The microcontroller 100 then reads the specified number of bytes from the printer 54, wraps the data with the appropriate NPAP header, and writes the data at a step 254 to a 1284 read buffer (e.g., at a buffer 114). The host may then read the data over the 1284 port.

If the data received is not a read command (at step 250), then the microcontroller 100 takes the appropriate action for other specified commands at a step 260. For example, the host computer 42 can specify the target printer 54 to the converter 10, using a command to the converter logic unit. In this manner, the converter 10 knows the identity of the target printer 54 and can operate with any printer. Note that the converter 10 typically must process packets for the converter logical unit before configuring the printer 54, which is described below in reference to FIG. 5.

If the destination of the NPAP packet is the printer logical unit, as determined by a decision step 246, then the converter 10 writes the data given in the NPAP command to the printer 54 at a step 248. If step 246 determines that the NPAP packet destination is not the printer logical unit, then the logic flow is directed back to step 240. Following the NPAP specification, the converter 10 must always be able to accept one full packet at any time. Therefore, the converter preferably uses double buffering and error status to control the data flow. The converter 10 has sufficient space in its buffers 114 to receive two full packets. This allows the converter 10 to receive a second packet while processing a first packet. If the second packet is received over the 1284 port before transmitting the data for the first packet to the printer 54, the converter 10 will acknowledge the second packet with an error status. However, this is unlikely to occur because of the much greater speed of the 1394 bus over the 1284 communications link.

Figure 5:
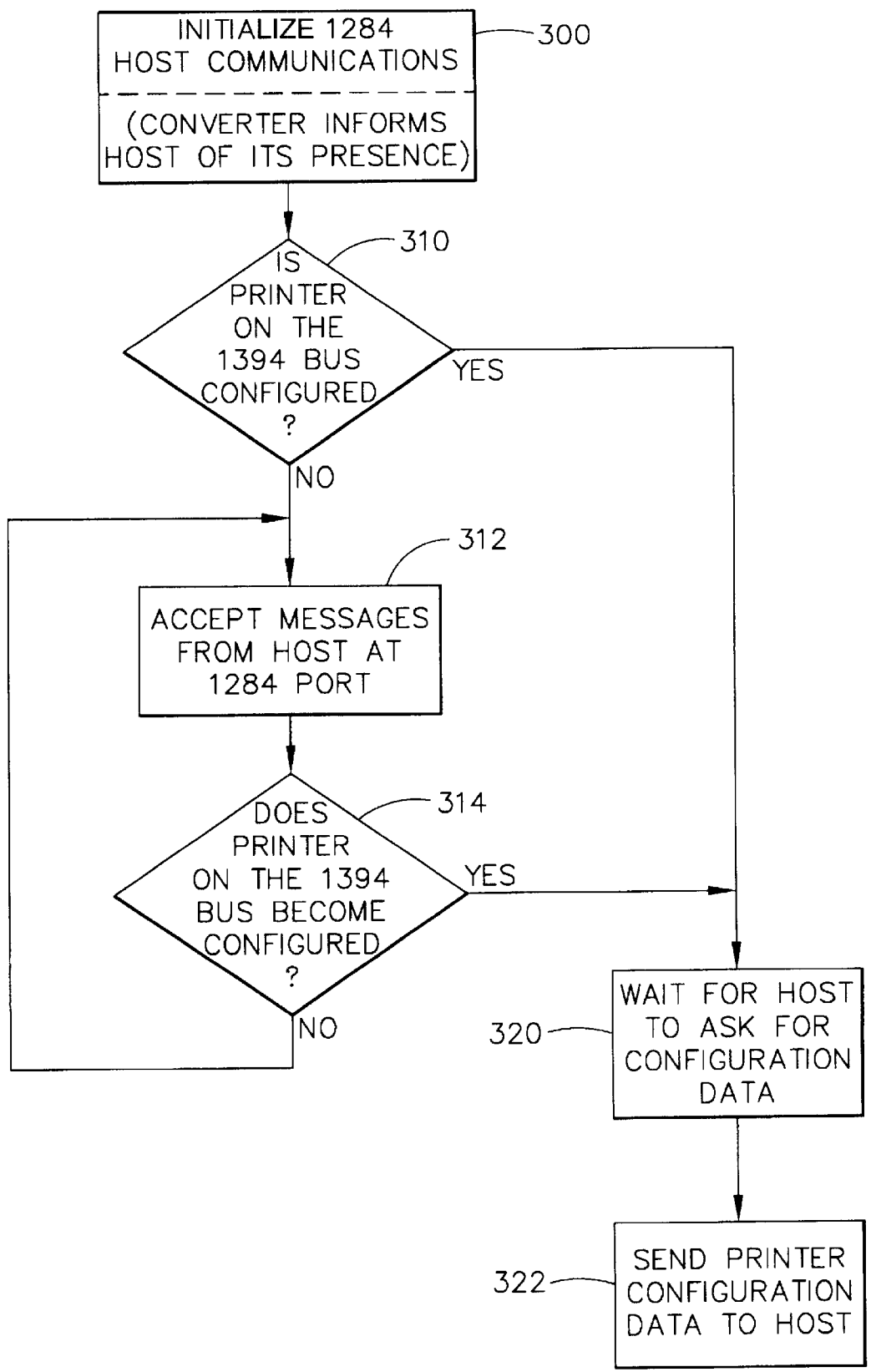
FIG. 5 is a flow chart of some of the functional steps performed by the 1284-to-1394 converter of FIG. 1 before the printer is configured.

FIG. 5 is a flow chart showing some of the important operational steps that are performed by the converter 10 before the printer 54 is configured. Beginning at a step 300, the converter 10 informs the host (e.g., host computer 42) of its presence during an initialization procedure of the 1284 communications link. A decision step 310 now determines whether or not a printer connected to the 1394 bus has been configured. If the answer is YES, then a step 320 causes the converter 10 to wait for the host 42 to ask for configuration data. When that request is received at converter 10, the configuration data for that printer (e.g., printer 54) is sent to the host 42.

If the result at decision step 310 was NO, then converter 10 at a step 312 accepts messages from the host 42 via the 1284 port (i.e., through the 1284 plug at 40). After that occurs, the converter 10 determines whether or not the printer on the 1394 bus (e.g., printer 54) is now to be configured. If the answer is YES, then the logic flow is directed to decision step 320, where the converter waits for the host at 42 to ask for the printer's configuration data. If the result at step 314 instead is NO, then the logic flow returns to step 312, where the converter 10 again accepts messages from the host 42 via the 1284 port. The printer configuration data must ultimately be sent to the host 42, or there will be no need to use the converter 10 to communicate between the host and the printer on the 1394 bus.

It will be understood that the logical operations described in relation to the flow chart of FIG. 5 can be implemented using sequential logic, such as by using microprocessor technology or using a logic state machine; it even could be implemented using parallel logic. The preferred embodiment uses a microprocessor (e.g., microprocessor 150) to execute software instructions that are stored in memory cells within ASIC 20. Of course, other circuitry could be used to implement these logical operations depicted in FIG. 5 without departing from the principles of the present invention.

It will be further understood that the precise logical operations depicted in the flow charts of FIGS. 4 and 5, and discussed hereinabove, could be somewhat modified to perform similar, although not exact, functions without departing from the principles of the present invention. The exact nature of some of the decision steps and other commands in these flow charts are directed toward specific models of printer systems (those using Lexmark printers, for example) and certainly similar, but somewhat different, steps would be taken for use with other types of printing systems in many instances, although the overall inventive results would be the same.

Figure 6:
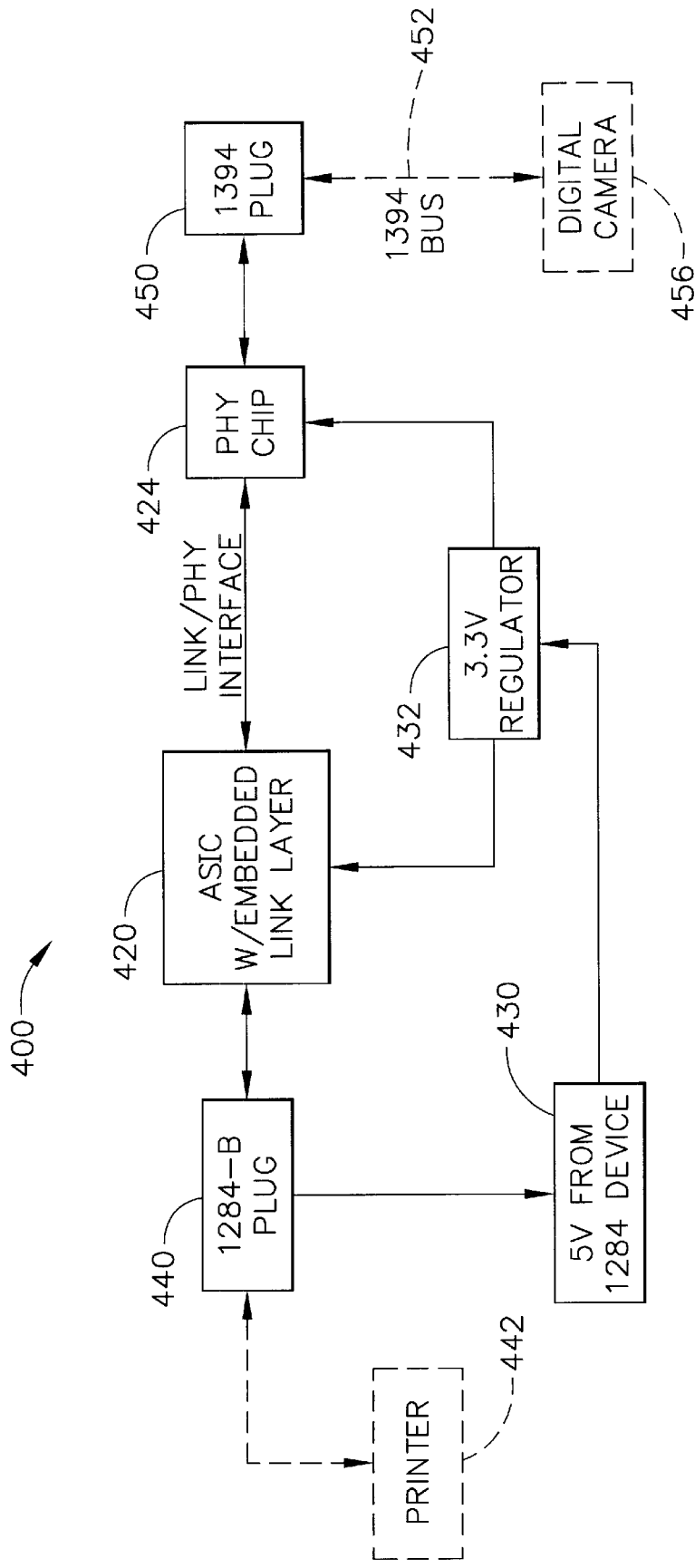
FIG. 6 is a block diagram of the major components of a peer-to-peer 1394-to-1284 converter, as constructed according to the principles of the present invention.

The 1394-to-1284 converter of the present invention is also configurable to allow a printer with a 1284-B receptacle (parallel port) to be attached to a 1394 bus. The converter communicates with printers supporting the ECP mode of the IEEE 1284 protocol as default. On printers that do not support ECP mode, the converter uses byte and nibble modes. FIG. 6 is a block diagram of this converter configuration, generally indicated by the reference numeral 400, which is called a "peer-to-peer converter" because the 1394 device that prints to the converter 400 and the converter itself are peers on the 1394 bus.

The converter 400 could use a 1284-A connector and connect to the printer with a standard 1284 cable. In the preferred implementation, however, the converter 400 is connected to a printer at 442 with a 1284-B plug 440 that is integral with the converter 400 or is attached thereto with a non-detachable cable. In this implementation, the converter 400 is powered by the 5 Volts (at 430) supplied by the printer 442 on pin 18 of the 1284-B plug 440. The converter 400 uses a 3.3 Volt regulator at 432 to supply power to an ASIC 420 and a 1394 Phy chip at 424. Pin 18 is not connected on a standard 1284 cable, so the converter 400 would have to rely on the 1394 bus at 452 for power, or provide its own power supply (e.g., at 430) if a 1284-A connector and cable are used. The power rail would then be delivered from the 1394 bus 452 through a 1394 plug at 450. A digital camera at 456 could be connected to this 1394 plug 450, and can communicate to printer 442 through converter 400. In this circuit, the digital camera 456 can act as a host; other types of 1394 devices could instead be used, such as DPP ("Direct Print Protocol"—for the 1394 protocol) or SBP-2 ("Serial Bus Protocol-2") devices.

Figure 7:
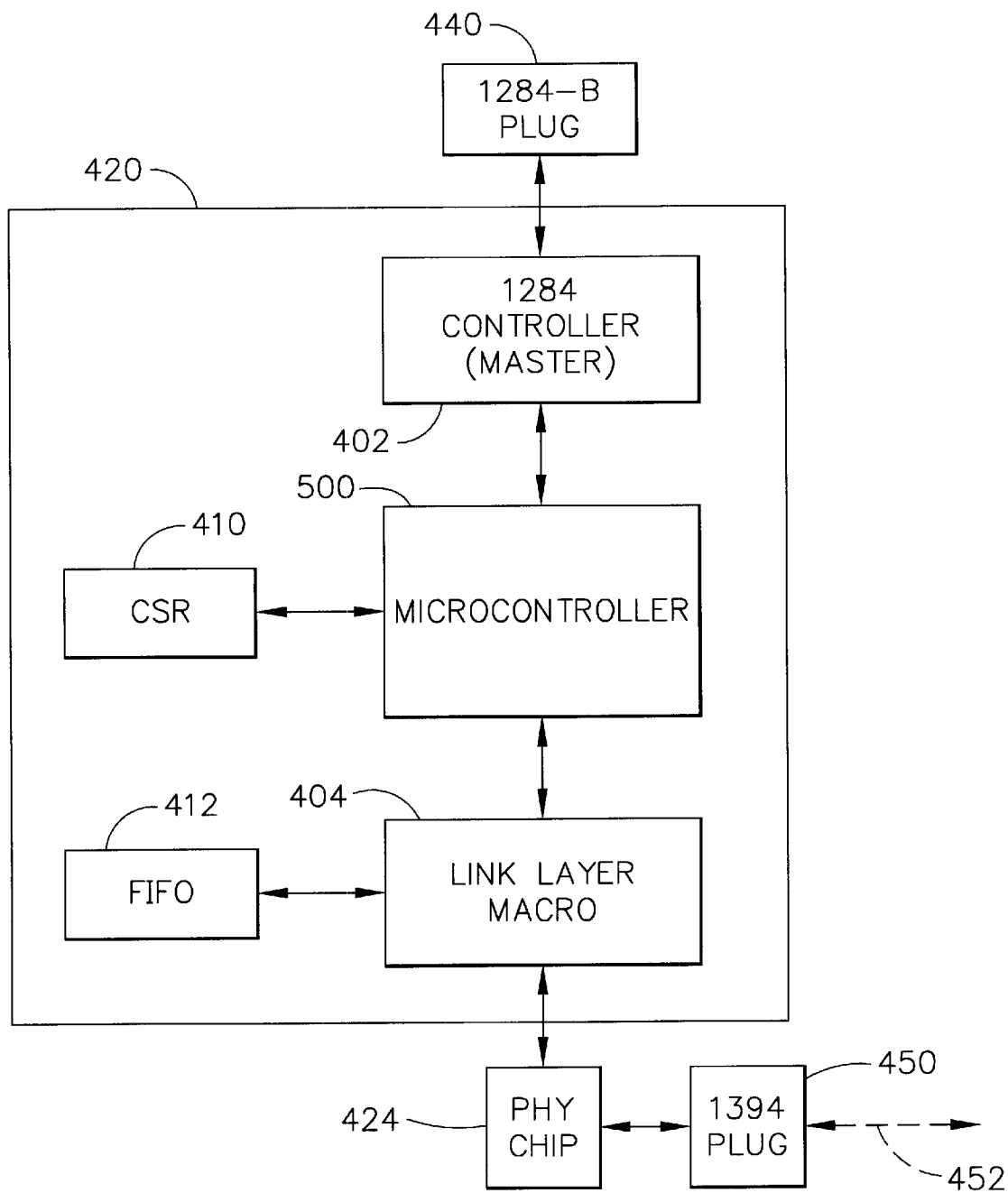
FIG. 7 is a block diagram of some of the hardware components of the preferred ASIC used in the peer-to-peer 1394-to-1284 converter of FIG. 6.

A block diagram of the ASIC 420 is shown in FIG. 7. The ASIC 420 consists of a microcontroller 500 coupled to a 1284 controller 402, a CSR block 410, and a 1394 Link layer macro 404. The 1284 controller 402 is a master for the printer's slave controller—i.e., it initiates and controls the flow of data on the 1284 interface through the plug 440. As in the 1284-to-1394 converter 10, the Link layer macro 404 is a conventional design for 1394 devices and uses embedded SRAM modules for the FIFOs at 412.

The ASIC microcontroller 500 could be implemented using a microprocessor and its support components, or entirely in logic consisting of state machines, registers, and combinatorial logic. In the preferred implementation, microcontroller 500 is implemented using a microprocessor 550 (see FIG. 8). The microprocessor implementation substantially reduces the logic design effort, as an existing processor can be used. Also, the microprocessor implementation better facilitates modifications, because most modifications would involve only changes to the ROM, with no changes to the hardware logic. With external non-volatile storage devices, such as ROM, EPROM, Flash, etc., the changes can be made without modifying the ASIC. With an embedded ROM, some of the ASIC internal elements would change, but changing the contents of an embedded ROM is much simpler than modifying other ASIC logic circuits.

Figure 8:
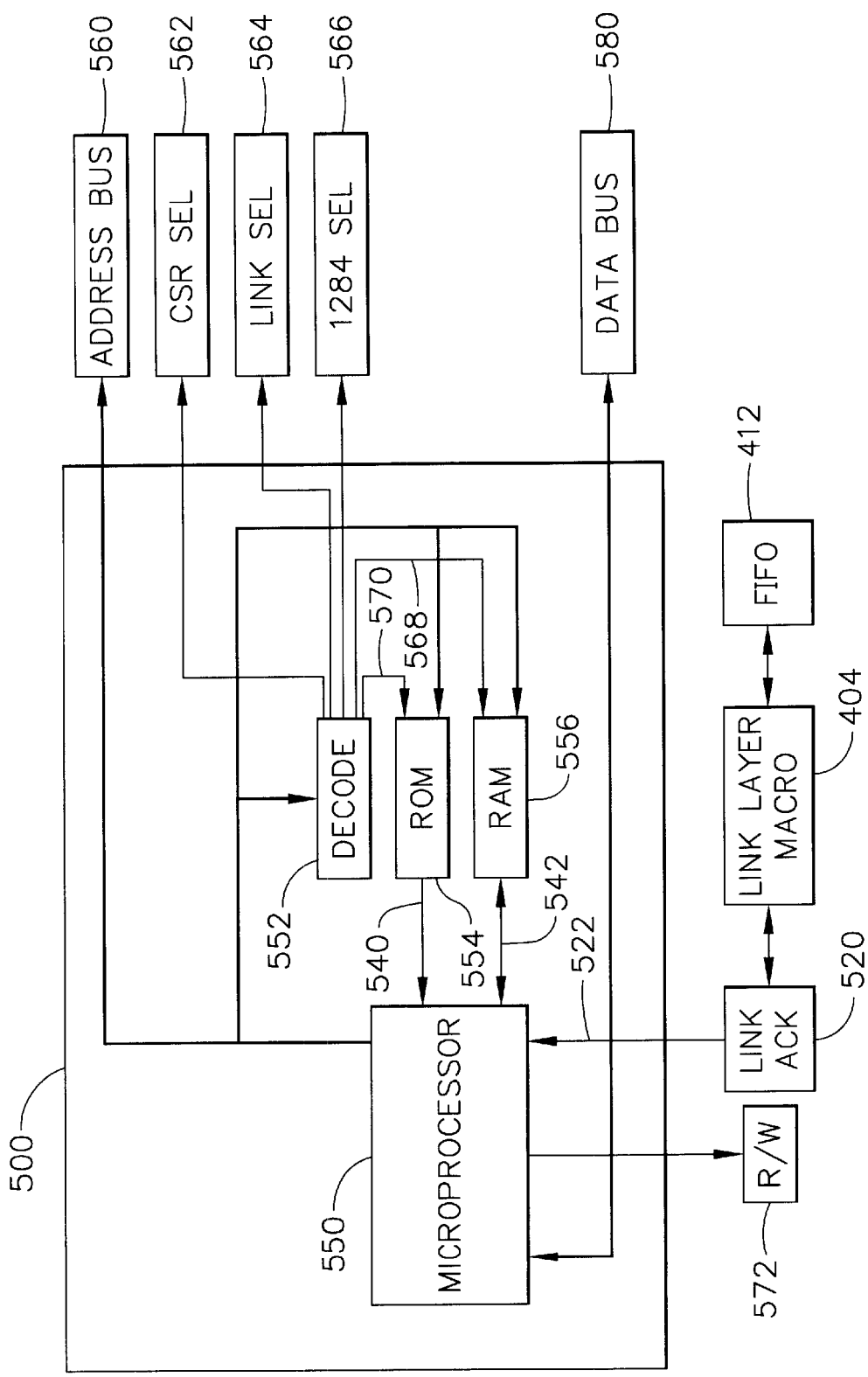
FIG. 8 is a block diagram of a microcontroller circuit embedded in the ASIC of FIG. 7.

A block diagram of the microcontroller 500 with a microprocessor 550 and embedded RAM at 556 and ROM at 554 is depicted in FIG. 8. In addition, the controller 500 contains a "decode" block at 552. This decode block 552 maps the CSR 410, 1284 controller 402, Link layer 404, ROM 554, and RAM 556 blocks into the address space of the microprocessor 550. The CSR block 410, the 1284 controller 402, and the 1394 link-layer 404 each contain registers that can be accessed by microprocessor 550, and the decode block 552 also contains circuitry which allows the microprocessor 550 to read from and write to those registers. The decode block 552 controls several chip select lines to obtain access to the other blocks of circuitry; the CSR block 410 is selected by a "CSR Select" line 562, the Link layer 404 is selected by a "Link Select" line 564, the 1284 controller 402 is selected by a "1284 Select" line 566, and the microcontroller's ROM and RAM are selected typically by multiple lines each, represented at 570 and 568, respectively.

The microprocessor 550 also is in communication with an address bus 560, a data bus 580, and a Read/Write line 572 that are additionally provided to other components of the microcontroller 500. Microprocessor 550 is further in communication with additional data lines at 540 and 542, that interface with the ROM 554 and RAM 556, respectively. A Link Acknowledge signal line at 520 is also in communication with microprocessor 550 to acknowledge communications between the 1394 bus 452 and the microcontroller 500, which involves the Link Layer macro 404 and its associated FIFO buffers at 412, which store data being received and transmitted over the 1394 bus.

The microcontroller 500 performs many tasks in the present invention. One of these tasks is responsible for detecting, configuring, and receiving data from the printer 442 over the 1284 interface via plug 440. Another task is responsible for 1394 configuration, receiving data over the 1394 bus 452, processing the received data, and writing print data to the printer 442 over the 1284 interface. A flow chart for the first above task is provided in FIG. 9, and for the second above task in FIG. 10.

Figure 9:
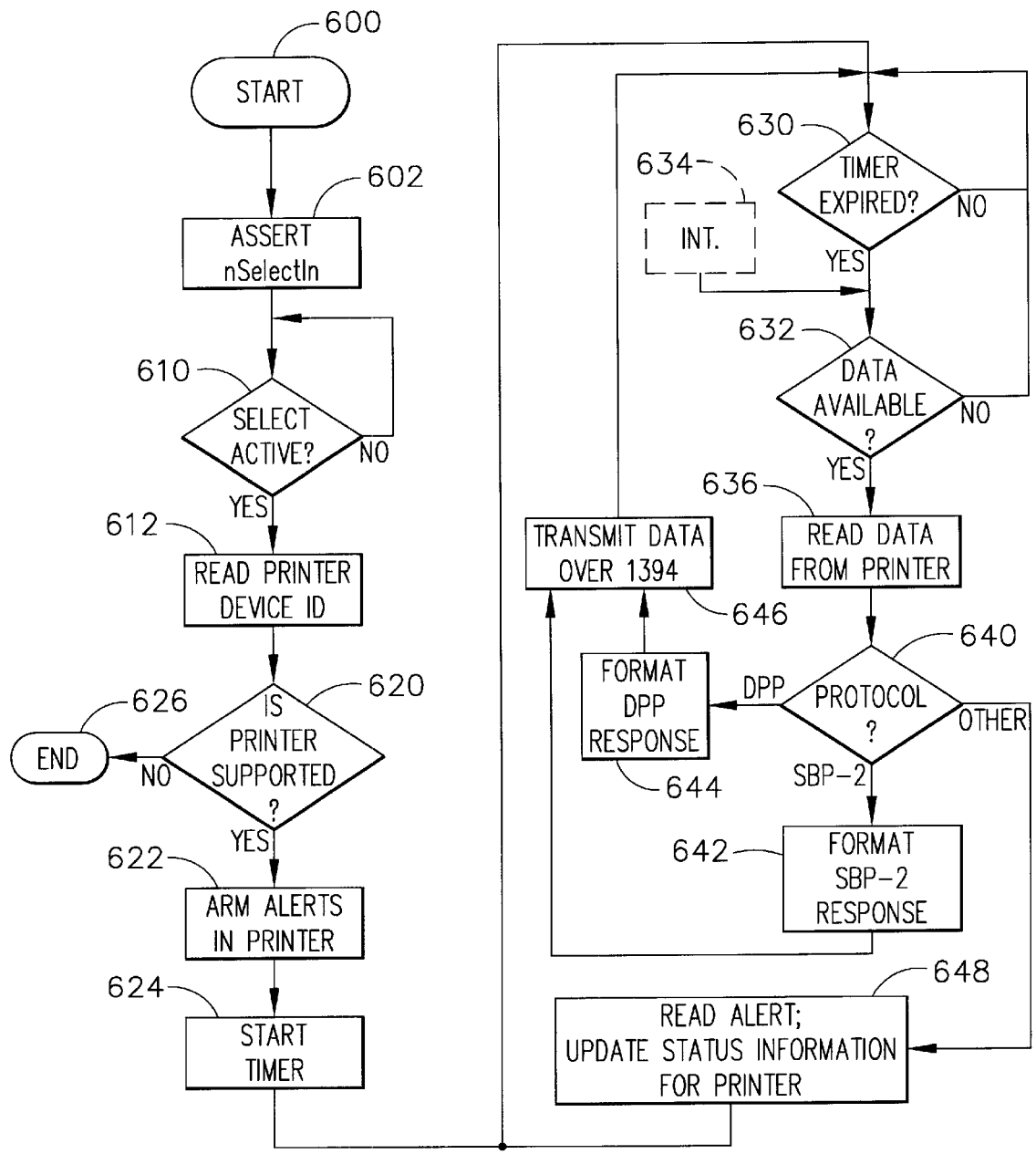
FIG. 9 is a flow chart of some of the functional steps for detecting, configuring, and receiving data from the printer over its 1284 interface that are performed by the peer-to-peer 1394-to-1284 converter of FIG. 6.

Referring now to FIG. 9, after the converter's power-on reset is complete at a step 600, the converter 400 asserts an "nSelectIn" signal on the 1284 interface at a step 602. The converter 400 waits for an active Select response from the printer at a decision step 610, and when the converter 400 receives the Select signal, it knows that it is connected to a powered-on printer. The converter 400 then reads the 1284 device identification string from the printer at a step 612. A decision step 620 now determines whether or not the "found" printer type is supported by converter 400. If the printer is not supported by the converter 400 then the converter stops this logic procedure at a step 626.

The converter will generally support only a specific printer or family of printers, because it must format the data for the printer. In the preferred implementation, a supported printer, using the NPAP protocol, notifies its host (e.g., the digital camera 456) of various error and status conditions using asynchronous device alerts. The alerts are not active until they are "armed," so the converter 400 arms the appropriate alerts at a step 622. The converter 400 is the master of the 1284 interface, and so it is responsible for reading the alerts from the printer 442, which it does by periodically reading the printer 442 on the expiration of a timer. The converter sets up the timer at a step 624 and waits for its expiration at a decision step 630. In the preferred implementation, the timer expiration generates an interrupt to the processor 550 so the processor does not need to continuously poll the timer. This interrupt appears as a step 634 on the flow chart of FIG. 9.

At the expiration of the read timer (or upon an interrupt), the host 456 checks if the printer 442 has data to send using the standard 1284 protocol at a decision step 632. If the printer has data available, then the converter 400 reads the NPAP alert from the printer at a step 636. Otherwise, the converter 400 continues to wait for the time to expire at step 630, or an interrupt at step 634.

The preferred converter 400 supports DPP and SBP-2 protocols, and at a decision step 640, determines which of these protocols is current. If the active protocol on the 1394 bus 452 is DPP, the converter 400 determines if the alert from the printer 442 should be reported under the DPP protocol. If the alert is to be reported, the converter 400 formats the message for the DPP protocol at a step 644 and sends the response at a step 646. If the active protocol on the 1394 bus is SBP-2, the converter 400 determines if the alert from the printer 442 should be reported under the SBP-2 protocol. If the alert is to be reported, the converter 400 formats the message for the SBP-2 protocol at a step 642 and sends the response at step 646. If the converter 400 is not connected to the 1394 bus 452, or is connected but neither protocol is active at step 640, then the converter reads the alert and updates its status information for the printer at a step 648. The converter's receive task then waits for the next timer expiration.

Figure 10:
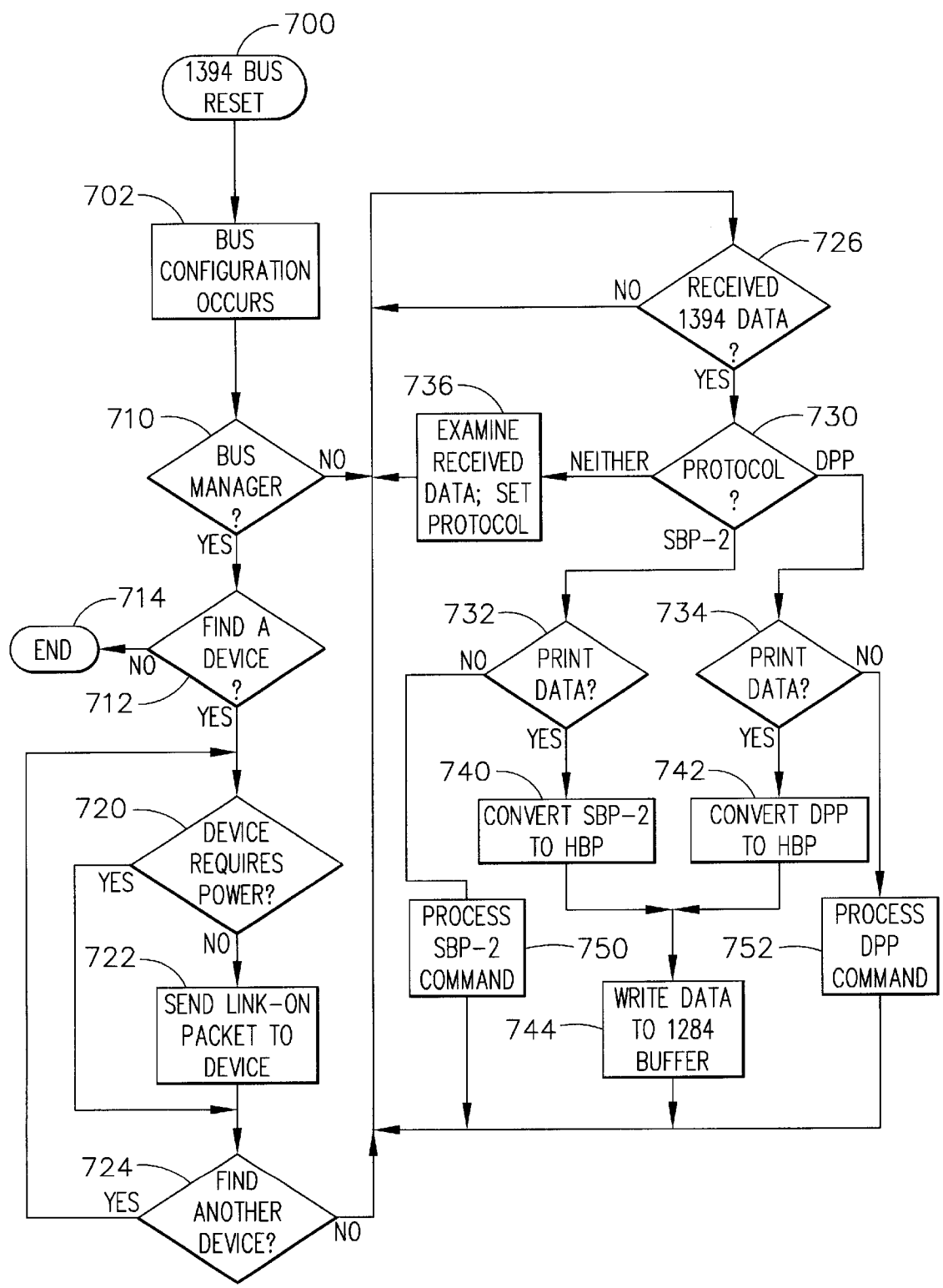
FIG. 10 is a flow chart of some of the functional steps for 1394 configuration, receiving data over the 1394 bus, processing the received data, and writing print data to the printer over the 1284 interface, which are performed by the peer-to-peer 1394-to-1284 converter of FIG. 6.

A flow chart for the "other" task is shown in FIG. 10. The process begins at a step 700 when a bus reset occurs on the 1394 bus 452, and the bus soon thereafter is configured at a step 702. The converter 400 is bus manager capable, but typically does not provide power to the 1394 bus 452. Therefore, when the converter 400 is chosen as the bus manager at a decision step 710, it only enables the devices on the 1394 bus 452 that do not require electrical power from the bus 452. It does this by selecting the first device on the bus at a decision step 712, and querying it for its power requirements at a decision step 720. If the converter 400 does not find a device at step 712, then it terminates this task at a step 714.

If the current "found" device does not need bus power at step 720, then the converter 400 sends the device a Link-On packet at a step 772 to enable the device. On the other hand, if the "found" device requires electrical power from the bus 452, the converter ignores it by directing the logic flow from the YES result at step 720 to a step 724. The converter then repeats this process for the next device at a decision step 724, until every device on the bus has been examined. The converter is then finished with its bus manager responsibilities, and the logic flow is directed from the NO result at step 724 to a decision step 726.

At decision step 726, the converter now waits until it receives data from the 1394 bus. At a decision step 730, the converter 400 now determines which protocol is active, once data is received at step 726. If neither SBP-2 nor DPP protocol is active, then the converter 400 examines the received data at decision step 730 to determine the active protocol, and sets it accordingly at a step 736. The converter 400 now proceeds based on the current protocol.

For either protocol, the converter 400 first determines if the data received is print data at a decision step 732, or 734, depending on the protocol. If it is print data, the converter 400 changes the SBP-2 or DPP formatted data at either a step 740 or a step 742 into the host-based printing (HBP) format understood by an attached Lexmark inkjet printer, or into another protocol as appropriate for other printers. The microcontroller 500 writes the formatted data to the 1284 write buffer at a step 744, and the 1284 controller transfers the data to the printer. If the data received is not print data, then the converter 400 analyzes the command for the current protocol at either a step 750 or a step 752, and takes the appropriate action based on the printer's status as known by the converter.

It will be understood that the logical operations described in relation to the flow charts of FIGS. 9 and 10 can be implemented using sequential logic, such as by using microprocessor technology or using a logic state machine; it even could be implemented using parallel logic. The preferred embodiment uses a microprocessor (e.g., microprocessor 550) to execute software instructions that are stored in memory cells within ASIC 420. In fact, the entire microprocessor 550 (and microcontroller 500, for that matter) are contained within ASIC 420 in the preferred mode of the present invention. Of course, other circuitry could be used to implement these logical operations depicted in FIGS. 9 and 10 without departing from the principles of the present invention.

It will be further understood that the precise logical operations depicted in the flow charts of FIGS. 9 and 10, and discussed hereinabove, could be somewhat modified to perform similar, although not exact, functions without departing from the principles of the present invention. The exact nature of some of the decision steps and other commands in these flow charts are directed toward specific models of printer systems (those using Lexmark printers, for example) and certainly similar, but somewhat different, steps would be taken for use with other types of printing systems in many instances, although the overall inventive results would be the same.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

What is claimed is:

1. A method for controlling a 1284-to-1394 converter, said method comprising:

providing a Link layer that communicates with a 1284 port, a Physical layer that communicates with a 1394 bus, a host device that is in communication with said 1284 port, and at least one external 1394 compliant device that is in communication with said 1394 bus;

controlling said Link layer by inspecting said 1284 port and determining whether or not data is being received at said 1284 port from said host device, and if so:

(a) determining whether or not the received data comprises a command for configuring said at least one external 1394 compliant device, and if so, configuring said at least one external 1394 compliant device; and (b) determining whether or not the received data is to be transmitted to said configured at least one 1394 compliant device over the 1394 bus, and if so, converting said received data and transmitting it to said configured at least one 1394 compliant device.

2. The method as recited in claim 1, further comprising controlling said Physical layer by inspecting said 1394 bus after a 1394 bus reset and determining whether or not said converter is to be the 1394 bus manager, and if so, allocating power resources to appropriate of said at least one 1394 compliant device.

3. The method as recited in claim 1, further comprising controlling said Physical layer by determining if said at least one 1394 compliant device comprises a printer before attempting to configure said at least one 1394 compliant device.

4. A method for controlling a 1284-to-1394 converter, said method comprising:
   providing a Link layer that communicates with a 1284 sort, a Physical layer that communicates with a 1394 bus, a host device that is in communication with said 1284 port, and at least one 1394 compliant device that is in communication with said 1394 bus;
   controlling said Physical layer by attempting to configure said at least one 1394 compliant device;
   controlling said Link layer by inspecting said 1284 port and determining whether or not data is being received at said 1284 port from said host device, and if so, determining whether or not the received data is to be transmitted to said at least one 1394 compliant device over the 1394 bus, and if so, converting said received data and transmitting it to said at least one 1394 compliant device;
   controlling said Physical layer by determining if said at least one 1394 compliant device comprises a printer before attempting to configure said at least one 1394 compliant device; and
   determining whether said received data is for a converter logical unit or for a printer logical unit.

5. The method as recited in claim 4, wherein if said received data is for said converter logical unit, then determining whether or not said received data comprises a read command, and if so, inputting said received data from said printer by way of said 1394 bus and writing said received data to a 1284 buffer.

6. The method as recited in claim 4, wherein if said received data is for said printer logical unit, then transmitting said received data to said printer by way of said 1394 bus.

7. The method as recited in claim 1, further comprising: initializing 1284 host communications between said converter and said host device.

8. The method as recited in claim 7, wherein the step of initializing 1284 host communications comprises: determining whether or not said 1394 compliant device is a printer that has been configured, and if not, inputting said received data from said host device and attempt to configure said at least one 1394 compliant device as a supported printer.

9. The method as recited in claim 7, wherein the step of initializing 1284 host communications further comprises: once a supported printer has been configured that is in communication with said 1394 bus, waiting for said host device to ask said converter for said supported printer's configuration data, then transmitting that configuration data to said host device.

10. The method as recited in claim 8, wherein said host device is the communications master, and said converter is the communications slave.

11. A method for controlling a peer-to-peer 1394-to-1284 converter, said method comprising:
   providing a Link layer that communicates with a 1284 port, a Physical layer that communicates with a 1394 bus, a peripheral device that is in communication with said 1284 port, and at least one 1394 compliant device that is in communication with said 1394 bus;
   controlling said Link layer by asserting a select signal to said peripheral device by way of said 1284 port, then receiving a response signal from said peripheral device; and
   controlling said Physical layer by examining said at least one 1394 compliant device, receiving data by way of said 1394 bus and determining an active protocol of the received data, determining whether or not said received data comprises a predetermined type of data, and if so, converting and transmitting said predetermined type of data using said active protocol to said peripheral device by way of said 1284 port.

12. The method as recited in claim 11, further comprising: determining whether or not said peripheral device comprises a supported printer.

13. The method as recited in claim 12, wherein said step of determining whether or not said peripheral device comprises a supported printer comprises: reading an identification code received from said peripheral device.

14. The method as recited in claim 13, further comprising: if said identification code is appropriate, arming said printer for alerts; reading other messages received from said printer and, where appropriate, sending said other messages to said 1394 compliant device by way of said 1394 bus.

15. The method as recited in claim 11, further comprising: determining whether or not said converter is to become the 1394 bus manager.

16. The method as recited in claim 15, wherein if said converter is the 1394 bus manager, further comprising: determining during said examining procedure whether or not said at least one 1394 compliant device requires power to be sourced from said converter, and if not, transmitting over said 1394 bus a link-on message to enable said at least one 1394 compliant device.

17. The method as recited in claim 11, wherein said predetermined type of data comprises print data.

18. The method as recited in claim 15, wherein said converter is the communications master, and said peripheral device is the communications slave.

19. A converter apparatus, comprising:
   a 1294 interface circuit;
   a controller circuit;
   a Physical layer that acts as a 1394 interface circuit; and
   a Link layer that is in communication with said 1284 interface circuit and which is in communication with said Physical layer;
   wherein:
      (a) said controller circuit and Link layer are contained within a unitary electronic structure;
      (b) a host device is in communication with said 1284 interface circuit;
      (c) an external peripheral device is in communication with said Physical layer; and
      (d) said controller circuit is configured:
         (i) to determine by use of said 1284 interface circuit, whether or not data is being received from said host device, and if so, to determine if the received data comprises a command for configuring said external peripheral device, and if so, to configure said external peripheral device by use of said Physical layer;
         (ii) to determine, by use of said 1284 interface circuit, whether or not data is being received from said host device, and if so, to determine whether or not the received data is to be transmitted to said printer, and if so, to convert said received data and transmit it to said printer.

20. The converter apparatus as recited in claim 19, wherein said controller is further configured to inspect said 1394 bus after a 1394 bus reset and determine whether or not said converter is to be the 1394 bus manager, and if so, to allocate power resources to any appropriate 1394 compliant devices.

21. The converter apparatus as recited in claim 19, wherein said controller is further configured to determine whether or not data received at said 1284 interface circuit comprises a read command for a converter logical unit, and if so, to input said received data from said printer by way of said 1394 bus and to write said received data to a 1284 buffer, and wherein said controller is further configured to determine if said received data is for a printer logical unit, and if so, to transmit said received data to said printer.

22. A converter apparatus, comprising:

a 1284 interface circuit;

a controller circuit;

a Physical layer that acts as a 1394 interface circuit; and a Link layer that is in communication with said 1284 interface circuit and which is in communication with said Physical layer;

wherein said controller circuit and Link layer are contained within a unitary electronic structure, and wherein a printer is in communication with said 1284 interface circuit, and a 1394 compliant device is in communication with said Physical layer, said converter apparatus thereby comprising a peer-to-peer 1394-to-1284 converter.

23. The converter apparatus as recited in claim 22, wherein said controller is configured to:

(a) assert a select signal to said printer by way of said 1284 interface, then to receive a response signal from said printer; and (b) examine said 1394 compliant device, to receive data from said 1394 compliant device and determine an active protocol of the received data, to determine whether or not said received data comprises a predetermined type of data, and if so, to convert and transmit said predetermined type of data using said active protocol to said printer by way of said 1284 interface circuit.

24. The converter apparatus as recited in claim 23, wherein said controller is further configured to determine whether or not said printer comprises a supported printer by reading an identification code received from said printer.

25. The converter apparatus as recited in claim 24, wherein, if said identification code is appropriate, said controller is further configured to arm said printer for alerts, read other messages received from said printers, and where appropriate, send said other messages to said 1394 compliant device.

26. The converter apparatus as recited in claim 24, wherein said controller is further configured to determine whether or not said converter is to become the manager of a 1394 bus that is in communication with said 1394 interface circuit.

27. The converter apparatus as recited in claim 26, wherein, if said converter is the 1394 bus manager, said controller is further configured to determine whether or not said 1394 compliant device requires power to be sourced from said converter, and if not, to transmit over said 1394 bus a link-on message to enable said 1394 compliant device.

* * * * *